United States Patent
Omoto et al.

(10) Patent No.: US 8,084,707 B2
(45) Date of Patent: Dec. 27, 2011

(54) LASER IRRADIATION APPARATUS, LASER IRRADIATION METHOD, FABRICATION METHOD FOR THIN FILM SEMICONDUCTOR DEVICE AND FABRICATION METHOD FOR DISPLAY APPARATUS

(75) Inventors: Keisuke Omoto, Aichi (JP); Minoru Nakajima, Aichi (JP); Masatoshi Inagaki, Aichi (JP)

(73) Assignee: Sony Corporation, Tokyo (JP)

( * ) Notice: Subject to any disclaimer, the term of this patent is extended or adjusted under 35 U.S.C. 154(b) by 1159 days.

(21) Appl. No.: 11/844,502

(22) Filed: Aug. 24, 2007

(65) Prior Publication Data

US 2008/0053969 A1 Mar. 6, 2008

(30) Foreign Application Priority Data

Aug. 29, 2006 (JP) ................................. 2006-231506

(51) Int. Cl.
 *B23K 26/00* (2006.01)
(52) U.S. Cl. ........... 219/121.6; 219/121.61; 219/121.73; 219/121.78

(58) Field of Classification Search ............... 219/121.6, 219/121.65, 121.66, 121.73, 121.78, 121.81, 219/121.61, 121.62
See application file for complete search history.

(56) References Cited

U.S. PATENT DOCUMENTS

| | | | | | |
|---|---|---|---|---|---|
| 4,682,855 | A | * | 7/1987 | Honda et al. | 359/614 |
| 6,229,115 | B1 | * | 5/2001 | Voss et al. | 219/121.72 |
| 6,423,927 | B1 | * | 7/2002 | McCulloch | 219/121.66 |
| 7,312,418 | B2 | * | 12/2007 | Tanabe et al. | 219/121.65 |
| 7,563,732 | B2 | * | 7/2009 | Chang et al. | 438/795 |
| 7,759,608 | B2 | * | 7/2010 | LeMasson | 219/121.82 |
| 2002/0000330 | A1 | * | 1/2002 | Kinoshita | 174/261 |

FOREIGN PATENT DOCUMENTS

| | | | |
|---|---|---|---|
| DE | 2147284 A | * | 4/1975 |
| JP | 2001-156017 | | 6/2001 |
| WO | WO 2005093801 A1 | * | 10/2005 |

\* cited by examiner

*Primary Examiner* — M. Alexandra Elve
(74) *Attorney, Agent, or Firm* — SNR Denton US LLP

(57) ABSTRACT

Disclosed herein is a laser irradiation apparatus, including: an optical system configured to form laser light of a linear cross section to be irradiated on an irradiation object; and a cutting member having a light blocking portion configured to block the laser light formed in the linear cross section by the optical system to cut the laser light so as to have a predetermined length along a line longitudinal direction; the light blocking portion having a plurality of fins provided on the light blocking portion thereof so as to fetch and absorb the laser light.

20 Claims, 4 Drawing Sheets

LASER IRRADIATION APPARATUS, LASER IRRADIATION METHOD, FABRICATION METHOD FOR THIN FILM SEMICONDUCTOR DEVICE AND FABRICATION METHOD FOR DISPLAY APPARATUS

CROSS REFERENCES TO RELATED APPLICATIONS

The present invention contains subject matter related to Japanese Patent Application JP 2006-231506 filed in the Japan Patent Office on Aug. 29, 2006, the entire contents of which being incorporated herein by reference.

BACKGROUND OF THE INVENTION

1. Field of the Invention

This invention relates to a laser irradiation apparatus and a laser irradiation method for irradiating linear laser light on an irradiation object, and further relates to a fabrication method for a thin film semiconductor device and a fabrication method for a display apparatus for crystallizing a semiconductor film by irradiating linear laser light.

2. Description of the Related Art

In recent years, a thin film transistor (hereinafter referred to simply as TFT) for which a crystalline semiconductor film represented by a polycrystalline silicon film is used as a device for forming a driving circuit for controlling pixels or a switching device for pixels for a display apparatus such as a liquid crystal display apparatus, an organic EL (Electro Luminescence) display apparatus and so forth.

As a method for crystallizing an amorphous semiconductor film such as an amorphous silicon film, a method which uses laser light (laser beam) is known and disclosed, for example, in Japanese Patent Laid-Open No. 2001-156017. In this method, linear laser light is irradiated on an amorphous semiconductor film using a laser irradiation apparatus to heat the semiconductor film so as to be crystallized. Normally, the laser light used for the crystallization is pulse laser light, and by the semiconductor film is momentarily heated by the pulse laser light so as to be crystallized to obtain a crystalline semiconductor film.

FIGS. 5A and 5B schematically show an example of a configuration of an existing laser irradiation apparatus. Refer to FIGS. 5A and 5B, the laser irradiation apparatus includes an optical system 51, a pair of cutting members 52 and a table 53.

The optical system 51 forms laser light outputted from a laser light source not shown so as to have a linear cross section (cross section perpendicular to an optical axis). The cutting members 52 cut the laser light (linear beam) LB formed so as to have a linear form by the optical system 51 in a predetermined length in an X direction along a line longitudinal direction of the laser light LB, which is a left and right direction in FIG. 5.

The table 53 supports a substrate 54 on which a semiconductor film which is an irradiation object is formed. On a main face (top face) of the substrate 54, an amorphous semiconductor film 55 is formed at a stage before laser irradiation. Further, the table 53 is supported for movement by a table moving mechanism not shown.

In order to crystallize the semiconductor film 55 in a laser light irradiation target region 56 using the laser irradiation apparatus having the configuration described above, the substrate 54, on which the semiconductor film 55 which is the irradiation object is placed, is placed on the table 53 so as to be supported by the table 53. Then, the cross sectional shape of the laser light outputted from the laser light source not shown is converted into a linear form by the optical system 51, and then the linear laser light LB is irradiated from the optical system 51 on the substrate 54. At this time, part of the linear laser light LB, that is, the opposite end portions of the linear laser light LB, are block by the cutting members 52 to cut the laser light LB so as to have a predetermined length conforming to the size of the laser light irradiation target region 56 of the substrate 54.

Further, in order to irradiate the laser light on a wide area on the substrate 54, the table 53 is successively moved in a Y-direction at a fixed pitch in synchronism with a timing at which the laser light LB is irradiated. As a result, the semiconductor film 55 is crystallized by irradiation of the laser light LB.

SUMMARY OF THE INVENTION

However, the existing laser irradiation apparatus has a problem that, when the laser light LB is cut by the cutting members 52, the laser light is reflected upwardly by the surface or top face of the cutting members 52, and the reflected light has a harmful influence on the crystallization step of the semiconductor film.

Particular examples of the influence are described below. (1) The reflected light from the cutting members 52 returns to the laser light source and varies the output of the laser light. (2) The reflected light from the cutting members 52 returns to the optical path and interferes with the laser light thereby to vary the intensity of the laser light or give rise to local intensity non-uniformity of the laser light. (3) An optical device of the optical system 51 is heated by the reflected light from the cutting members 52 and thermally expanded thereby to vary the optical path of the laser light and the intensity of the laser light or make the intensity distribution of the laser light non-uniform.

According to an embodiment of the present invention, there is provided a laser irradiation apparatus including an optical system configured to form laser light of a linear cross section to be irradiated on an irradiation object, and a cutting member having a light blocking portion configured to block the laser light formed in the linear cross section by the optical system to cut the laser light so as to have a predetermined length along a line longitudinal direction, the light blocking portion having a plurality of fins provided thereon so as to fetch and absorb the laser light.

According to another embodiment of the present invention, there is provided a laser irradiation method including the steps of forming laser light of a linear cross section, cutting the laser light of the linear cross section so as to have a predetermined length in a line longitudinal direction using a cutting member which has a light blocking portion configured to block the laser light, and irradiating the laser light of the predetermined length in the line longitudinal direction on an irradiation object, the cutting member having a plurality of fins provided on the light blocking portion thereof and configured to fetch and absorb the laser light.

In the laser irradiation apparatus and the laser irradiation method, a plurality of fins are provided on a light blocking portion of a cutting member configured to cut laser light, and the laser light is fetched and absorbed by the fins. As a result, different from the existing technique, the laser light blocked for cutting can be prevented from being reflected by the surface of the cutting member. Consequently, the harmful influence of the laser light reflected by the cutting member can be prevented.

DETAILED DESCRIPTION OF THE PREFERRED EMBODIMENT

Figure 1A:
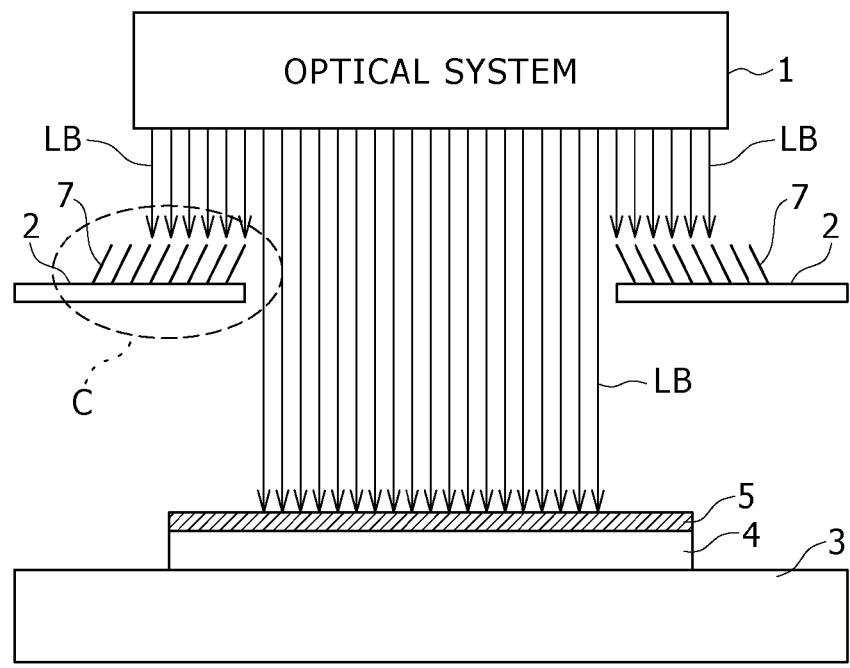
FIGS. 1A and 1B are a schematic side elevational view and a schematic top plan view, respectively, showing an example of a configuration of a laser irradiation apparatus to which the present invention is applied.
Figure 1B:
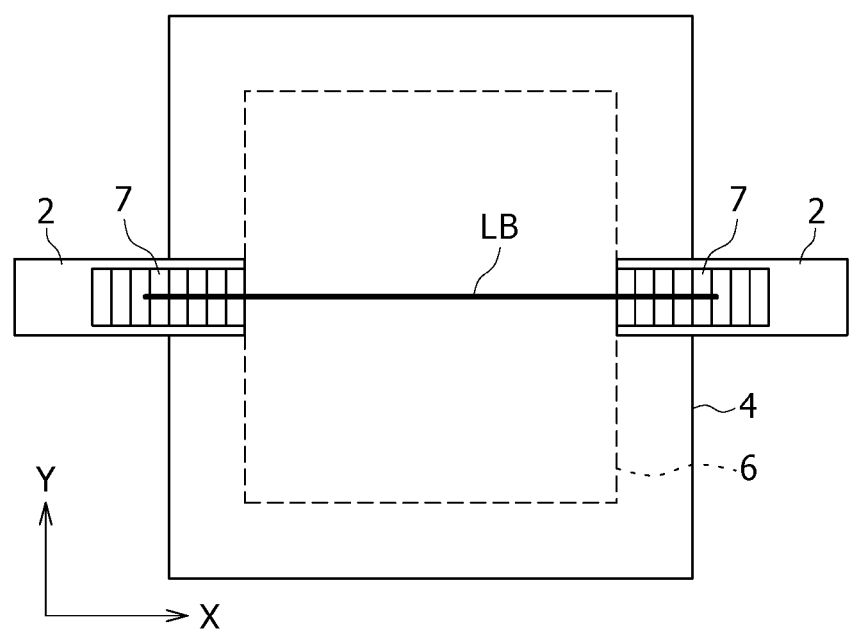

FIGS. 1A and 1B schematically show an example of a configuration of a laser irradiation apparatus to which the present invention is applied. Referring to FIGS. 1A and 1B, the laser irradiation apparatus shown includes an optical system 1, a pair of cutting members 2 and a table 3.

The optical system 1 forms laser light outputted from a laser light source not shown so as to have a linear cross section perpendicular to an optical axis. The laser light source outputs laser light in the form of pulse laser light using, for example, a pulse oscillation type excimer laser as an oscillation source. The optical system 1 is configured using an optical device such as, for example, a cylindrical lens. In the optical system 1, the laser light outputted from the laser light source is converted into linear laser light LB which typically has a line length or longitudinal dimension of 300 mm and a line width or lateral directional dimension of approximately 100 to 500 μm.

The paired cutting members 2 cut the laser light or linear beam LB formed in a linear form by the optical system 1 to a predetermined length in an X-direction along the line longitudinal direction, which is a left and right direction in FIG. 1, of the laser light LB. The cutting members 2 are plate-formed members formed from a metal material such as aluminum and mounted at a position spaced upwardly by a predetermined distance from the table 3 using, for example, a mounting member such as a bracket not shown. The cutting members 2 are arranged in a state opposed to each other in a predetermined spaced relationship on the same line parallel to the X-direction. The cutting length of the laser light LB depends upon the distance (opposing distance) between the cutting members 2. Therefore, the cutting members 2 are provided for movement in directions toward and away from each other along the line longitudinal direction (X-direction) of the laser light LB such that the cutting length of the laser light LB can be adjusted to a laser light irradiation target region hereinafter described.

The table 3 supports a substrate 4 on which a semiconductor film which is an irradiation object is formed. For the substrate 4, for example, a glass substrate, a semiconductor substrate (silicon substrate or the like) or a plastic substrate is used. On the main face (top face) of the substrate 4, amorphous semiconductor film 5 formed from, for example, an amorphous silicon film is formed at a stage prior to laser irradiation. Further, the table 3 is supported for movement by a table movement mechanism not shown. The movement of the table 3 by the table movement mechanism is performed in order to irradiate the laser light LB on an entire laser light irradiation target region 6 set on the substrate 4 in a state wherein the irradiation position of the laser light is fixed in the Y-direction perpendicular to the line longitudinal direction.

Further, the cutting members 2 described above individually include a plurality of fins 7. The fins 7 are provided on a light blocking portion (portion at which the laser light LB which need not be irradiated on the irradiation object is irradiated) for cutting the laser light LB on the top face side of the cutting members 2.

Figure 2:
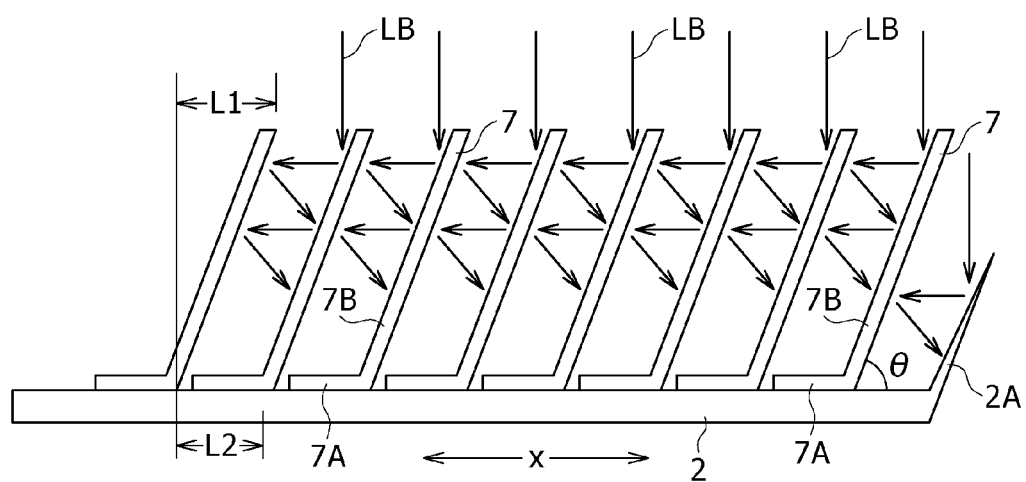
FIG. 2 is an enlarged view of a portion denoted by C in FIG. 1.

FIG. 2 is an enlarged view of a portion denoted by C in FIG. 1. As can be recognized from FIG. 2, the fins 7 are mounted on the top face of each of the cutting members 2 in an inclined state with respect to the optical axis of the laser light LB. The fins 7 are thin plate-formed members formed from a metal material such as aluminum, and are bent so that the inside angle thereof is an obtuse angle. Where each of the fins 7 is divided into a first portion 7A and a second portion 7B with respect to the bent portion, the first portion 7A is fixed to the cutting member 2 using a fixing member such as a screw not shown, and the second portion 7B is disposed so as to stand obliquely from the top face of the cutting member 2.

The second portion 7B of the fin 7 is inclined such that, when the laser light LB inputted to the light blocking portion for cutting is reflected on the surface (inclined face) of the second portion 7B, the reflected laser light is directed outwardly along the line longitudinal direction, that is, the X-direction. The outward direction described here indicates a direction away from the central position of the length of the laser light LB along the line longitudinal direction. By disposing the second portion 7B of the fin 7 in such an inclined direction as described above, the laser light reflected by the second portion 7B can be prevented with certainty from returning to the optical path of the laser light LB for crystallization which passes the space between the cutting members 2.

Further, if the top face (mounting face for the fins 7) of the cutting member 2 defines the right angle with respect to the optical axis of the laser light LB, then the inclination angle 8 of the second portion 7B of the fin 7 is set, for example, within a range of θ=45° to 75° with respect to the top face of the cutting member 2. It is to be noted that the direction and the angle of the fin 7 is set commonly to all of the fins 7 mounted on one of the cutting members 2. Further, where the left and right cutting members 2 are compared with each other, the inclination angle θ of the fin 7 is commonly set, but the inclination direction of the fin 7 is opposite between the cutting members 2. Further, the front and rear faces of the first portion 7A of the fin 7 are preferably formed as roughened faces by a roughening process such as a sand blasting process, and the front and rear faces of the second portion 7B of the fin 7 are preferably formed as mirror faces by mirror finish such as a polishing process.

Further, the fins 7 are arranged linearly along the X-direction (line longitudinal direction of the laser light) such that at least a portion thereon on which the laser light LB is to be irradiated is covered fully. By arranging the fins 7 in this manner, the cutting member 2 can be covered in a wide range in the X-direction with the fins 7. In the arrangement of the fins 7, the relationship between the length L1 from the bent portion of the fin 7 to the end of the second portion 7B in the X-direction and the length L2 from the bent portion of the fin 7 to the end of the first portion 7A of another fin 7 adjacent in the X-direction is set to L1≧L2 such that the first portion 7A of the fin 7 is entirely hidden by the second portion 7B of the adjacent fin 7 when the fins 7 are viewed from the optical axis direction, that is, from above, of the laser light LB.

Further, each of the end portions of the cutting members 2 opposed to each other adjacent the cut ends of the laser light LB is formed in an acute-angled or sharp knife edge form and is inclined obliquely in an upward direction with the knife edge portion thereof directed upwardly with respect to the optical axis of the laser light LB similarly to the second portion 7B of the fins 7. The end portion 2A forms part of the arrangement of the fins 7. The reason why the end portion 2A of the cutting member 2 is formed in a sharp knife edge form is that it is intended to prevent the laser light reflected by the end portion 2A of the cutting member 2 from returning upwardly toward the optical system 1.

Now, a laser irradiation method, a fabrication method for a thin film semiconductor device and a fabrication method for a display apparatus to which the present invention is applied are described. In the laser irradiation method, laser light of a linear cross section is formed, and the laser light of the linear cross section is cut so as to have a predetermined length in a line longitudinal direction using a cutting member 2 which has a light blocking portion configured to block the laser light. Then, the laser light of the predetermined length in the line longitudinal direction is irradiated on an irradiation object. The cutting member 2 has a plurality of fins 7 provided on the light blocking portion thereof and configured to fetch and absorb the laser light LB.

Meanwhile, in the fabrication method for a thin film semiconductor device, laser light of a linear cross section is formed, and the laser light of the linear cross section is cut so as to have a predetermined length in a line longitudinal direction using a cutting member 2 which has a light blocking portion configured to block the laser light. Then, the laser light of the predetermined length in the line longitudinal direction is irradiated on a semiconductor film to crystallize the semiconductor film. The cutting member 2 has a plurality of fins 7 provided on the light blocking portion thereof and configured to fetch and absorb the laser light LB. Thus, the laser irradiation method described above is applied to the fabrication method for a thin film semiconductor device in which the laser light cut so as to have the predetermined length in the line longitudinal direction is used for the crystallization of a semiconductor film. The fabrication method for a thin film semiconductor device can be applied, for example, as a fabrication method for a TFT array in which a glass substrate is used.

Further, in the fabrication method for a display apparatus, laser light of a linear cross section is formed, and the laser light of the linear cross section is cut so as to have a predetermined length in a line longitudinal direction using a cutting member 2 which has a light blocking portion configured to block the laser light. Then, the laser light of the predetermined length in the line longitudinal direction is irradiated on a semiconductor film to crystallize the semiconductor film. The cutting member 2 has a plurality of fins 7 provided on the light blocking portion thereof and configured to fetch and absorb the laser light LB. Thus, the laser irradiation method described above is applied to the fabrication method for a display apparatus in which the laser light cut so as to have the predetermined length in the line longitudinal direction is used for the crystallization of a semiconductor film. The fabrication method for a display apparatus can be applied, for example, as a fabrication method for a liquid crystal display apparatus or an organic EL display apparatus in which a TFT array is used, for example, as a switching element for use with pixels or as an element which forms a driving circuit for controlling pixels.

Details of the laser irradiation method are described below. First, where a semiconductor film 5 in a laser light irradiation target region 6 is to be crystallized using the laser irradiation apparatus having the configuration described above, the substrate 4 on which the semiconductor film 5 which is an irradiation object is placed is placed on and supported by the table 3 and the sectional shape of the laser light (pulse laser or the like) outputted from the laser light source not shown is converted into a linear form by the optical system 1 so that the linear-formed laser light LB is irradiated from the optical system 1 on the substrate 4.

Thereupon, part of the linear-formed laser light LB, that is, the opposite end portions of the linear-formed laser light LB in the line longitudinal direction are intercepted by the paired cutting members 2 to cut the laser light LB in a predetermined length conforming to the size of the laser light irradiation target region 6 of the substrate 4. Generally, linear laser light to be used for crystallization of a semiconductor film is parallel light, and therefore, the cut length of the laser light LB, that is, the length of the laser light LB in the X-direction by the cutting member 2 is adjusted before laser irradiation so as to conform to the length of the laser light irradiation target region 6 of the substrate 4, that is, to the length of the laser light irradiation target region 6 in the X-direction.

Further, in order to irradiate the laser light over a wide area of the substrate 4, the table 3 is moved successively in the Y-direction at a fixed pitch in synchronism with the irradiation timing of the laser light LB. More particularly, the table 3 is moved successively in the Y-direction at intervals of a pitch smaller than the width (size in the Y-direction) of the linear-formed laser light LB so that the laser light LB is irradiated on the semiconductor film 5 on the substrate 4 at each of the movement positions to irradiate the laser light LB on the semiconductor film 5 in the laser light irradiation target region 6 by a plural number of times. As a result, the semiconductor film 5 is instantaneously heated and melted by irradiation of the laser light LB and is crystallized upon cooling solidification. Here, while the table 3 is moved in the Y-direction, alternatively the laser light LB may be scanned in the Y-direction in place of the movement of the table 3.

Further, where the laser light LB is cut by the cutting members 2, the fins 7 are provided on the light blocking portions of the cutting members 2 for cutting the laser light LB as described above. Consequently, the laser light LB blocked by the cutting member 2 without being irradiated on the substrate 4 on which the semiconductor film 5 which is an irradiation object is placed is inputted to the light blocking portions for cutting on the top face side of the cutting member 2. The fins 7 are provided on the light blocking portions, which are portion on which the laser light LB which need not be irradiated on the substrate 4 is irradiated, as described above. Therefore, the laser light LB inputted to the light blocking portion is fetched between the fins 7 adjacent to each other in the X-direction as shown in FIG. 2.

The laser light LB fetched in this manner gradually advances to the interior portion, that is, in the direction toward the first portion 7A, of the fins 7 while reflected repetitively many times between the front and rear faces each in the form of a mirror face, as the reflection faces, of the second portions 7B opposed to each other of the fins 7 adjacent to each other in the X-direction. Then, the laser light LB is attenuated within a period of time within which the reflection occurs repetitively between the fins 7, and finally, the laser light LB is absorbed in the inside of the fins 7, that is, in the spaces between the fins 7 adjacent to each other in the X-direction. Therefore, where the laser light LB is cut by the cutting members 2, the laser light is prevented from being reflected upwardly by the surface or top face of the cutting members, different from the related art. Accordingly, a harmful influence of the laser light LB reflected by the cutting members 2 can be prevented.

In particular, since the reflected light from the cutting members 2 can be prevented from returning to the laser light source, the output variation of the laser light can be prevented. Further, since the reflected light from the cutting members 2 can be prevented from returning to the optical path and interfering with the laser light, the intensity variation of the laser light and the local intensity non-uniformity of the laser light can be eliminated. Further, since an optical device of the optical system 1 can be prevented from being heated by the reflected light from the cutting member 2, the optical path variation and the intensity variation of the laser light caused by the temperature variation of the optical device and non-uniformity of the intensity distribution can be eliminated. Therefore, the laser light LB can be irradiated uniformly on the entire laser light irradiation target region 6 set on the substrate 4.

Further, since, if the laser irradiation method of the present invention is applied to the fabrication method for a thin film semiconductor device, then the laser light can be accurately irradiated on the aimed portion with the stabilized laser output, the semiconductor film 5 on the substrate 4 can be crystallized uniformly. Therefore, the characteristic dispersion among TFTs can be reduced.

Further, particularly in an organic EL display apparatus among various display apparatus, if the crystallinity becomes non-uniform from influences of the output variation and the optical path variation of the laser light and the output profile variation in a crystallization process of a semiconductor film by irradiation of laser light, then the influences are easily manifested as dispersion of luminance of a display screen. Therefore, if the laser irradiation method of the present invention is applied to the fabrication method for an organic EL display apparatus, then the dispersion of the luminance can be suppressed to enhance the picture quality.

Further, while it is considered that, if the laser light LB is fetched and absorbed by the fins 7 as described above, then the fins 7 generate heat as a result of absorption of the laser light LB, the fins 7 are formed originally from a material having a high thermal conductivity such as a metal material such as aluminum and readily radiate the heat also from the structure thereof. Therefore, the heat generated by the absorption of the laser light LB can be radiated effectively from the fins 7. As a result, thermal deformation of the fins 7 and the cutting members 2 formed from metal plates can be prevented effectively.

Figure 3:
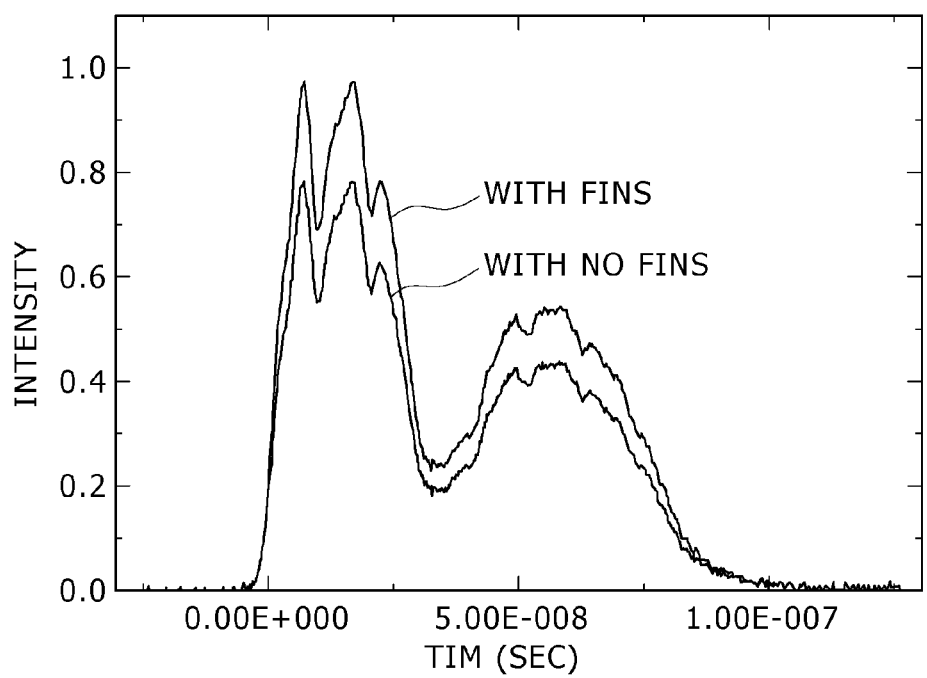
FIG. 3 is a diagram illustrating a result of an experiment in which the variation of a laser output is examined.

FIG. 3 illustrates a result of an experiment which was conducted to check the variation of the laser output per one pulse. Referring to FIG. 3, the axis of ordinate indicates the laser output (intensity) and the axis of abscissa indicates time. As recognized from FIG. 3, where the results in a case (with fins) wherein the fins 7 are provided and another case (with no fins) wherein no fins 7 are provided are compared with each other, a high laser output is obtained in the former case rather than in the latter case. The difference between the laser outputs in the former and latter cases indicates that the laser light reflected upwardly from the surface of the cutting member 2 comes as returning light to the laser light source and causes variation of the laser output, which results in loss of the output, from an influence of the returning light.

Figure 4A:
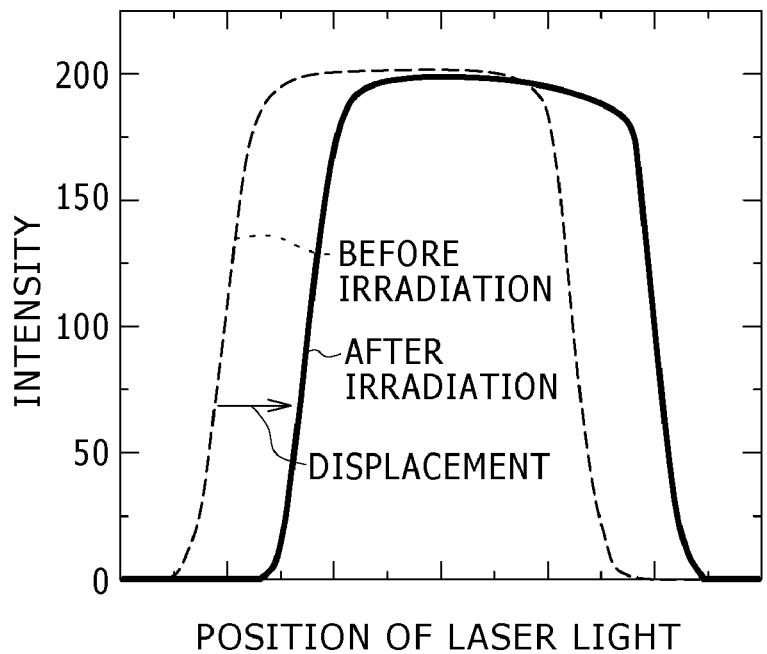
FIGS. 4A and 4B are diagrams illustrating a result of an experiment in which the position variation of laser light is examined.
Figure 4B:
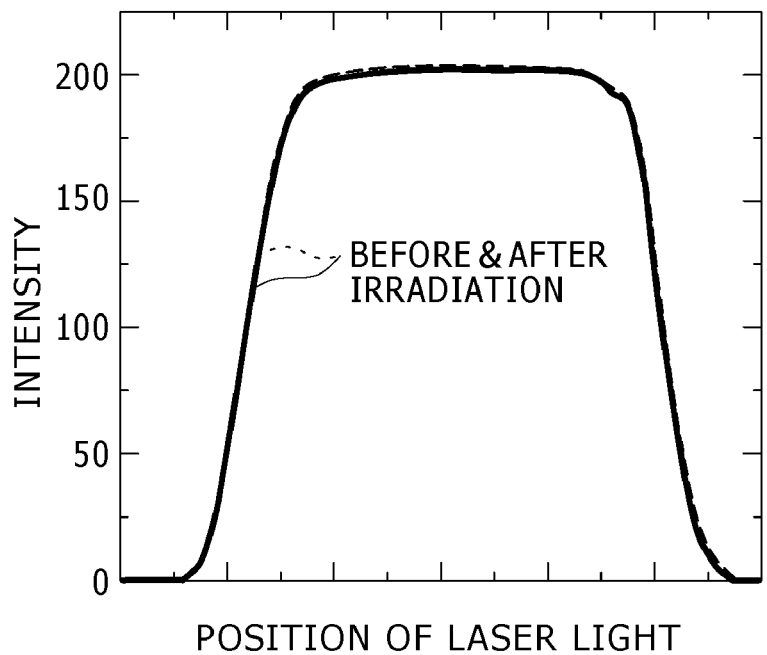
Figure 5A:
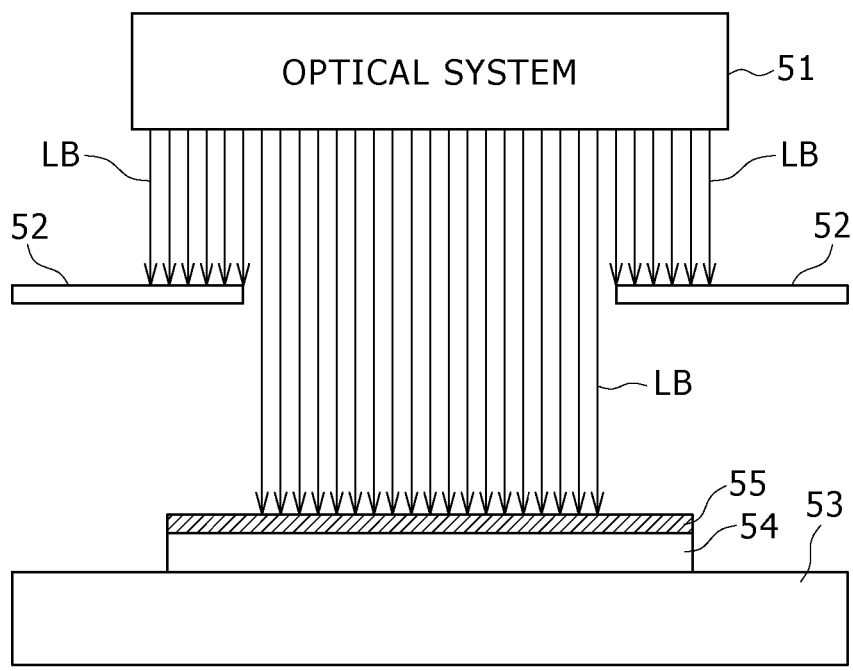
FIGS. 5A and 5B are schematic views showing an example of a configuration of an existing laser irradiation apparatus.
Figure 5B:
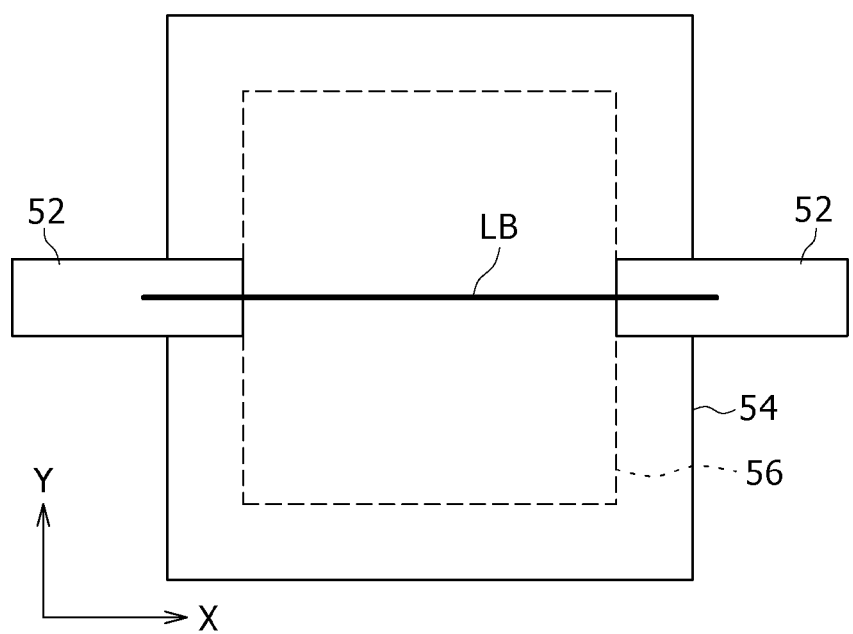

FIGS. 4A and 4B illustrate results of an experiment which was conducted to check the variation of the laser light across laser irradiation. Particularly, FIG. 4A indicates a result of the experiment where no fins are provided and FIG. 4B indicates results of the experiment where the fins are provided. In FIGS. 4A and 4B, the axis of ordinate indicates the laser output and the axis of abscissa indicates the position of laser light in a line lateral direction or widthwise direction. As recognized from FIGS. 4A and 4B, where no fins are provided, deviation (optical path variation) of the position of the laser light appears across the laser irradiation and a little variation is confirmed also in the profile (top hat type form) of the laser output. On the other hand, where the fins are provided, deviation of the position of the laser light does not appear across the laser irradiation and no variation is confirmed also in the profile of the laser output.

It is to be noted that, even if the fins 7 to be provided on the paired cutting members 2 are inclined in directions opposite to those in the embodiment described above, a remarkable effect can be expected when compared with an alternative case wherein no fins 7 are provided. Further, as the configuration of each fin 7, the second portion 7B may be formed in a vertical direction from the first portion 7A once while only an upper portion of the second portion 7B is inclined.

While a preferred embodiment of the present invention has been described using specific terms, such description is for illustrative purposes only, and it is to be understood that changes and variations may be made without departing from the spirit or scope of the following claims.

What is claimed is:

1. A laser irradiation apparatus, comprising:
an optical system configured to form laser light of a linear cross section to be irradiated on an irradiation object; and
a cutting member having a light blocking portion configured to block the laser light formed in the linear cross section by the optical system to cut the laser light so as to have a predetermined length along a line longitudinal direction,
wherein,
the light blocking portion has a plurality of fins provided on the light blocking portion thereof so as to fetch and absorb the laser light, and
the plurality of fins are angled such that an inside angle between a first portion of the plurality of fins parallel to the cutting member and a second portion of the plurality of fins is an obtuse angle.

2. The laser irradiation apparatus according to claim 1, wherein the plurality of fins are all arranged along the line longitudinal direction in an inclined state with respect to an optical axis of the laser light.

3. The laser irradiation apparatus according to claim 2, wherein the plurality of fins are inclined such that the direction of the laser light reflected from the second portion of the plurality of fins is directed outwardly in the line longitudinal direction.

4. A laser irradiation method, comprising the steps of:
forming laser light of a linear cross section;
cutting the laser light of the linear cross section so as to have a predetermined length in a line longitudinal direction using a cutting member which has a light blocking portion configured to block the laser light; and
irradiating the laser light of the predetermined length in the line longitudinal direction on an irradiation object,
wherein,
the cutting member have a plurality of fins provided on the light blocking portion thereof and configured to fetch and absorb the laser light, and the plurality of fins are angled such that an inside angle between a first portion of the plurality of fins parallel to the cutting member and a second portion of the plurality of fins is an obtuse angle.

5. The laser irradiation apparatus according to claim 1, wherein the plurality of fins are all arranged along the line longitudinal direction in an inclined state with respect to an optical axis of the laser light, the plurality of films are thin plate-formed members formed from a metal material and are separated by a predetermined distance.

6. The laser irradiation apparatus according to claim 1, wherein the cutting member includes two cutting members are operable to move toward and away from each other in the line longitudinal direction to adjust the predetermined length.

7. The laser irradiation apparatus according to claim 1, wherein the first portion of the plurality fins are mounted on a top face of the cutting member utilizing a fixing member.

8. The laser irradiation apparatus according to claim 1, wherein the plurality of fins include a left set and a right set, the cutting member include a left cutting member and a right cutting member, and an angle of the second portion of left set and the right set are equal and opposite.

9. The laser irradiation apparatus according to claim 1, wherein the second portion has a mirrored face, the first portion has a roughened face, the laser light is reflected a plurality of times off of the second portion before reaching the first portion.

10. The laser irradiation apparatus according to claim 1, wherein the second portion is angled such that the first portion is entirely hidden by the second portion when viewed from an optical axis direction.

11. The laser irradiation apparatus according to claim 1, wherein an inside edge of the cutting member adjacent the plurality of fins includes a knife-edge member angled to prevent the laser light from returning upward toward the optical system.

12. The laser irradiation method according to claim 4, further comprising:
adjusting a distance between cutting members comprising the cutting member in the line longitudinal direction to generate the predetermined length corresponding to a target region.

13. The laser irradiation method according to claim 4, further comprising:
converting the a pulse laser light to a linear form of the laser light.

14. The laser irradiation method according to claim 4, further comprising:
moving a table at a fixed pitch synchronized with irradiation timing of the laser light to irradiate a new portion of a target.

15. The laser irradiation method according to claim 4, wherein the plurality of fins include a left set and a right set, the cutting member includes a left cutting member and a right cutting member, and an angle of the second portion of the left set and the right set are equal and opposite.

16. The laser irradiation method according to claim 4, wherein the plurality of films are formed from a metal material and are separated by a predetermined distance.

17. The laser irradiation method according to claim 4, wherein the second portion has a mirrored face, the first portion has a roughened face, the laser light is reflected a plurality of times off of the second portion before reaching the first portion.

18. The laser irradiation method according to claim 4, wherein angle of the second portion is such that the first portion is entirely hidden by the second portion when viewed from an optical axis direction 19. The laser irradiation method according to claim 4, wherein an inside edge of the cutting member adjacent the plurality of fins includes a knife-edge member angled to prevent the laser light from returning upward toward the optical system.

20. The laser irradiation method according to claim 4, wherein the first portion of the plurality fins are mounted on a top face of the cutting member utilizing a fixing member.

* * * * *